United States Patent [19]

Plank

[11] E Patent Number: Re. 32,816

[45] Reissued Date of Patent: Jan. 3, 1989

[54] DRAWER APPARATUS

[76] Inventor: Robert R. Plank, 8426 Vine Valley Dr., Sun Valley, Calif. 91352

[21] Appl. No.: 151,275

[22] Filed: Feb. 1, 1988

Related U.S. Patent Documents

Reissue of:

[64] Patent No.: 4,589,711
Issued: May 20, 1986
Appl. No.: 686,093
Filed: Dec. 24, 1984

[51] Int. Cl.[4] ..... A47B 88/00

[52] U.S. Cl. ..... 312/330 R; 312/242

[58] Field of Search ..... 312/336, 242, 245, 204, 312/302, 303, 292, 274

[56] References Cited

U.S. PATENT DOCUMENTS

| | | | |
|---|---|---|---|
| 394,500 | 12/1888 | Newberry . | |
| 739,700 | 9/1903 | McFarland | 312/303 |
| 745,693 | 12/1903 | Tobey . | |
| 758,039 | 4/1904 | Andrews | 312/303 |
| 801,401 | 10/1905 | Roth . | |
| 815,535 | 3/1906 | Illig . | |
| 1,109,114 | 9/1914 | Dayton . | |
| 1,473,854 | 11/1923 | Heidland . | |
| 1,811,687 | 6/1931 | Goldberg . | |
| 1,865,212 | 6/1932 | Rogers | 312/303 X |
| 2,118,525 | 5/1938 | Richardson | 312/330 R |
| 2,716,583 | 8/1955 | Straubel . | |
| 2,775,501 | 12/1956 | Kyllo . | |
| 2,819,141 | 1/1958 | Myer . | |
| 2,992,754 | 7/1961 | Grimes | 312/242 |
| 3,146,048 | 8/1964 | Graham et al. . | |
| 3,192,003 | 6/1965 | Marcoux | 312/204 |
| 3,207,565 | 9/1965 | Scharge | 312/204 |
| 3,953,094 | 4/1976 | Brown | 312/303 |
| 4,023,871 | 5/1977 | Dantzler | 312/108 X |
| 4,261,122 | 4/1981 | Levine | 312/204 |
| 4,458,965 | 7/1984 | Ohlendorf et al. . | |

*Primary Examiner*—Joseph Falk
*Attorney, Agent, or Firm*—Jack C. Munro

[57] ABSTRACT

A drawer apparatus to be mounted through any substantially vertical planar wall wherein there is available unused space located behind the wall. An opening of selected size is formed within the wall. A drawer housing is mounted through the opening and positioned so that the floor of the drawer housing is located substantially horizontal. The drawer housing has a drawer housing face which is to be pivotable a limited amount relative to the drawer housing to accommodate different inclinations of the wall away from vertical. A separate drawer is to be mounted in a close conforming manner within the drawer housing. A drawer face is mounted in conjunction with the drawer which is also tiltable in respect to the drawer so as to be located at the same angle of inclination as the drawer housing face. The drawer face and the drawer housing face connect together when the drawer is completely in the retracted position. The drawer is movable from the retracted position to an extended position providing access into an article containing compartment located within the drawer.

21 Claims, 4 Drawing Sheets

DRAWER APPARATUS

Matter enclosed in heavy brackets [ ] appears in the original patent but forms no part of this reissue specification; matter printed in italics indicates the additions made by reissue.

BACKGROUND OF THE INVENTION

The field of this invention relates to the construction of a drawer and more particularly to an entire drawer assembly which is designed to be installed within a substantially vertical wall in order to make use of unused available space located behind the wall.

The structure of this invention is designed to be particularly useful within the environment of boats. Within the cabins of boats a substantial effort is expended to make use of every square inch of space. Even so, within every boat there is still wasted space. A typical example of wasted space would be the open space located beneath a seating bench.

One way in which unused space can be taken advantage of is through the use of a drawer. Drawers can be utilized to hold a wide variety of different types of articles. It would be desirable to construct some form of drawer which could be readily and simply mounted within planar sheet material wall structure in which there is open space behind the wall structure.

Although the structure of the present invention is designed to be of particular advantage when utilized in conjunction with boats, it is to be considered to be within the scope of this invention that the structure could be utilized within any environment, such as a home, a bus, a recreational vehicle, etc., wherever it is desired to make use of unused space.

SUMMARY OF THE INVENTION

The primary objective of the present invention is to construct a drawer assembly which can be quickly and easily mounted within an existing structure to take advantage of unused space.

The drawer assembly and method of installation of the present invention first requires the selecting of the location in which the drawer assembly is to be installed. A typical location would be through the substantially vertical wall behind which there is "dead space". This substantially vertical wall may be inclined as much as fifteen degrees in each direction away from vertical making a total angular variation of thirty degrees. Once the precise location has been selected, an opening of a certain size is formed within the vertical wall. A drawer housing is then positioned through the opening with the bulk of the drawer housing being located within the "dead space". The drawer housing is formed of two identical parts located in a facing interlocked manner forming a single unit. The front of the drawer housing connects to a drawer housing face. The drawer housing face has an outwardly extending thin flange which is to butt against the surface of the vertical wall located directly around the opening formed within the vertical wall. The drawer housing face is capable of being pivoted relative to the drawer housing to assume various angles of inclination in respect thereto. Angular relationships other than vertical would be required if the substantially vertically planar wall is located other than vertical. There is to be connected directly adjacent the back end of the drawer housing a supporting bracket assembly. A portion of the supporting bracket assembly is in turn to connect to a fixed structure which is vertically displaced above the drawer housing and which constitutes a portion of the fixed structure which defines the "dead space". The supporting bracket assembly can be adjusted so that the planar supportive surface of the drawer housing is located substantially horizontal. The position established by the drawer housing face is now fixed relative to the drawer housing. The drawer housing face is then permanently fixed relative to the vertical wall. A separate drawer which has an open top is to be locatable in a close conforming manner within the drawer housing. The open top may be closed by means of a openable cover. The drawer has an internal compartment which may be divided into a plurality of separate article supporting compartments by means of dividers. A drawer face is connected to the front wall of the drawer and is capable of a limited amount of pivoting movement relative thereto to accommodate various angles of inclination. The drawer face is to be adjusted to assume the identical angle of inclination that the drawer housing face has assumed with respect to the planar supportive surface of the drawer housing. The drawer housing face is then fixed in position relative to the drawer. The drawer is to be movable from a retracted position, substantially locating the drawer entirely within the drawer housing, to an extended position which permits access to within the internal compartment. When in the retracted position the drawer face substantially covers the drawer housing face and also abuts against the vertical wall.

DETAILED DESCRIPTION OF THE SHOWN EMBODIMENT

Figure 1:
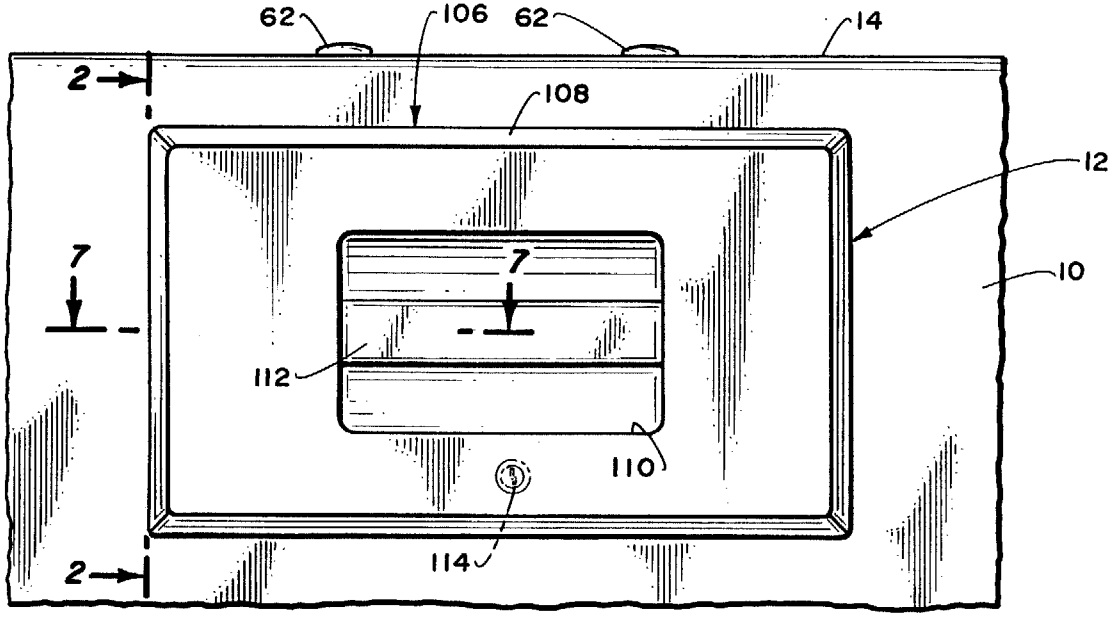
FIG. 1 is a front elevational view of the drawer apparatus of this invention showing the drawer apparatus as it would be completely installed with the drawer in the retracted or closed position.

Referring particularly to the drawings, there is shown in FIG. 1, a substantially vertical planar sheet material wall 10 within which is to be mounted the drawer apparatus 12 of the present invention. Let it be assumed that the wall 10 is located beneath a seating area which has a bottom 14. On the upper surface of the bottom 14 there will be normally located conventional seat cushions (not shown). The vertical wall 10 is angularly attached to the bottom 14. The vertical planar wall 10 and the bottom 14 combine together to form an open space or "dead space" 16 which is normally not utilized in any manner whatsoever.

Figure 2:
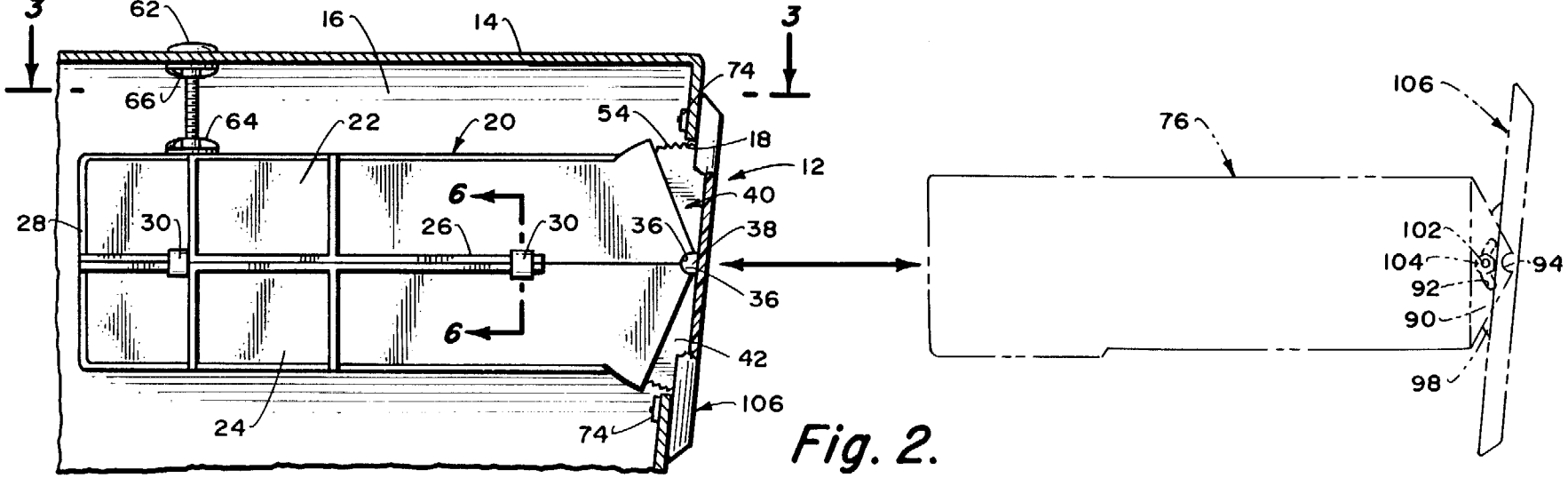
FIG. 2 is a side view of the drawer apparatus of the present invention taken along line 2—2 of FIG. 1 depicting in phantom lines the drawer itself spaced from the drawer housing within which the drawer is to be located.
Figure 3:
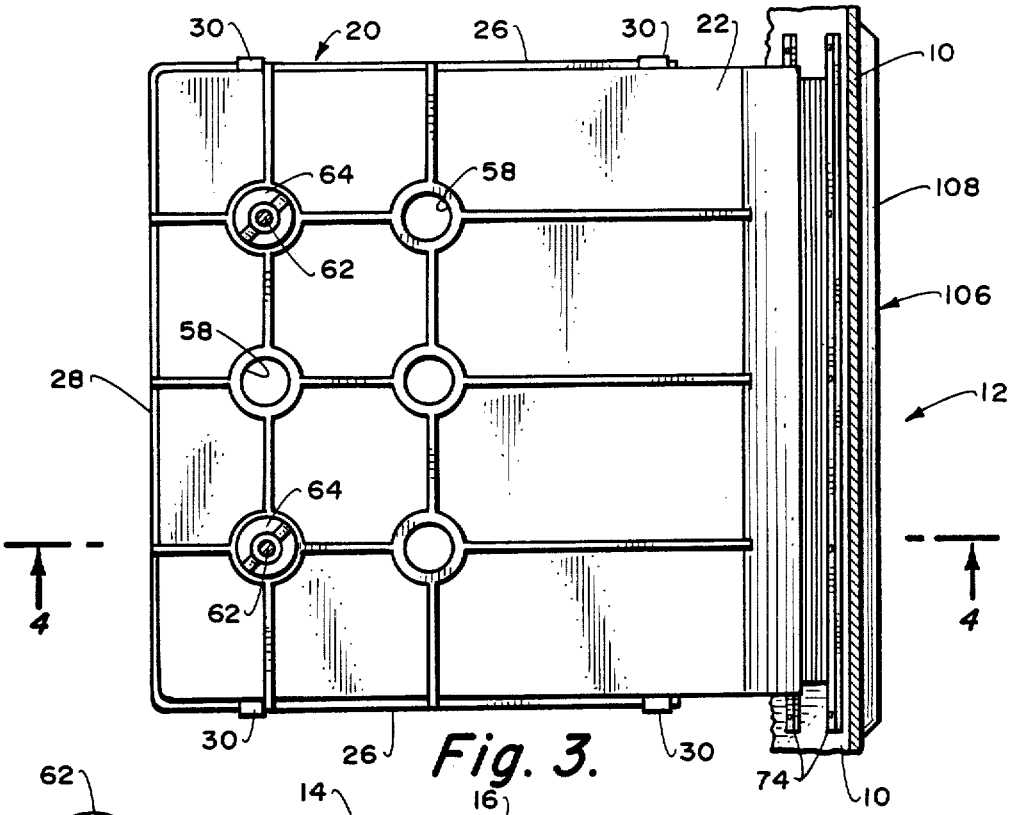
FIG. 3 is a top plan view of the drawer apparatus of this invention taken along line 3—3 of FIG. 2.
Figure 4:
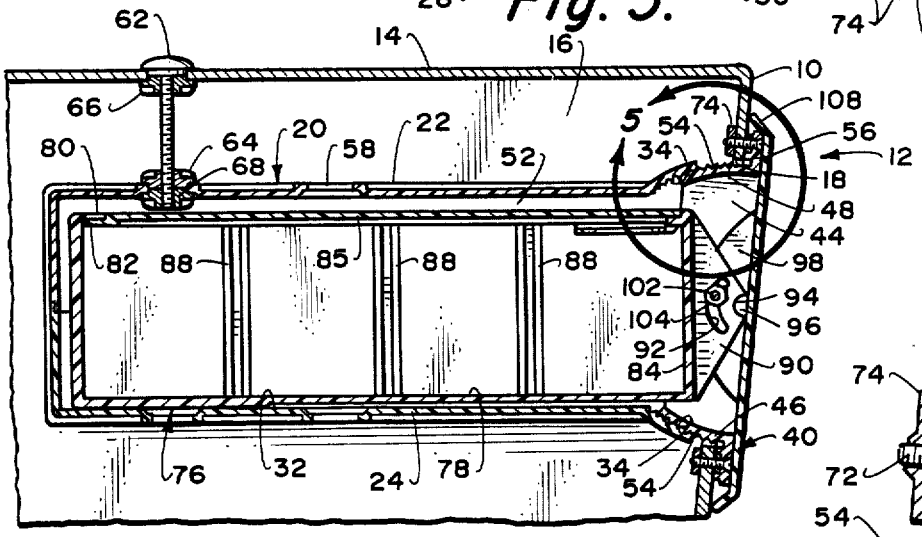
FIG. 4 is a cross-sectional view through the drawer apparatus of this invention taken along line 4—4 of FIG. 3.
Figure 5:
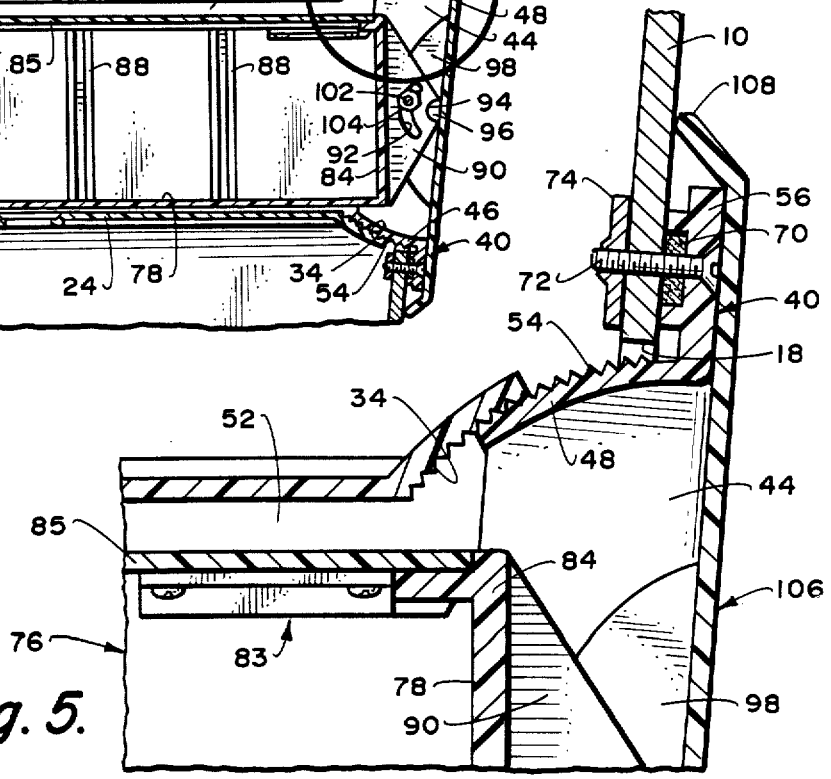
FIG. 5 is an enlarged cross-sectional view through a portion of the drawer apparatus of this invention taken along line 5—5 of FIG. 4.
Figure 6:
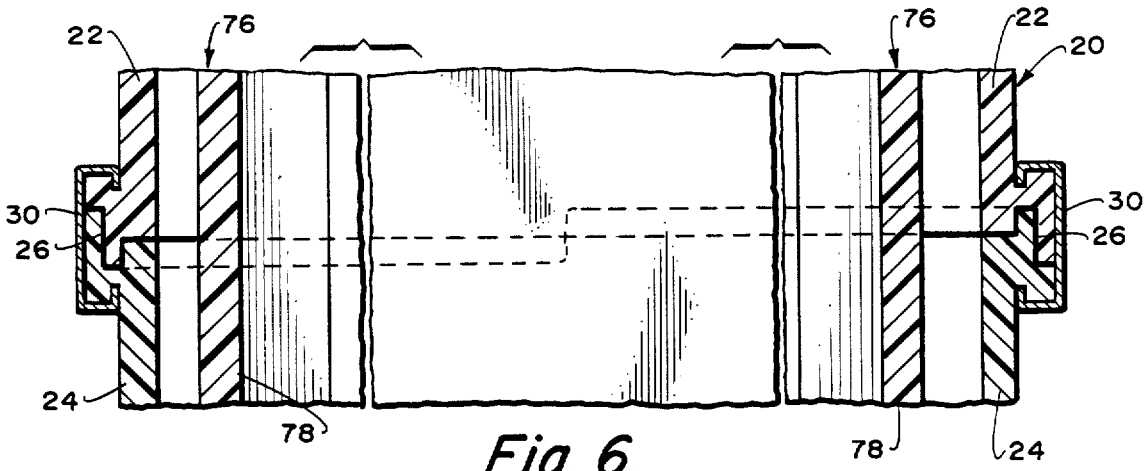
FIG. 6 is a cross-sectional view, to more clearly show the connection arrangement between the two identical parts of the drawer housing of the drawer apparatus of this invention, taken along line 6—6 of FIG. 2.
Figure 7:
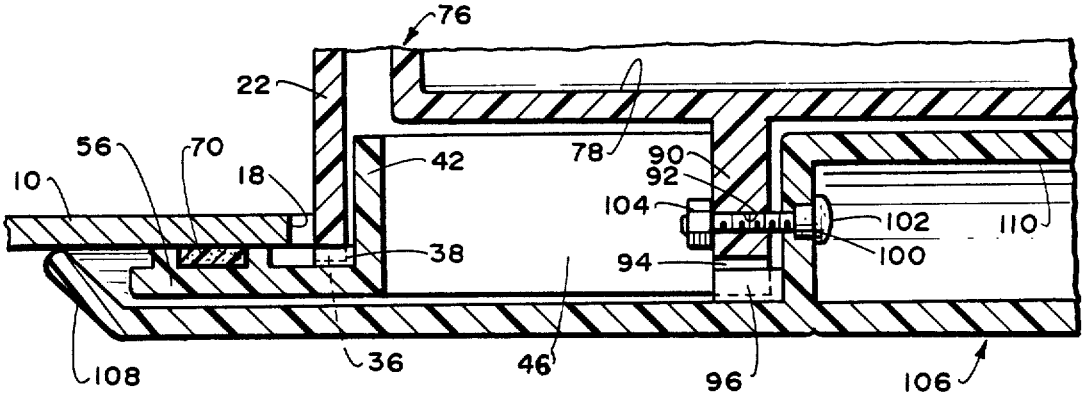
FIG. 7 is a cross-sectional view taken along line 7—7 of FIG. 1, showing in more detail the interrelationship between the drawer housing face and the drawer face, both of which are a part of the drawer apparatus of this invention.
Figure 8:
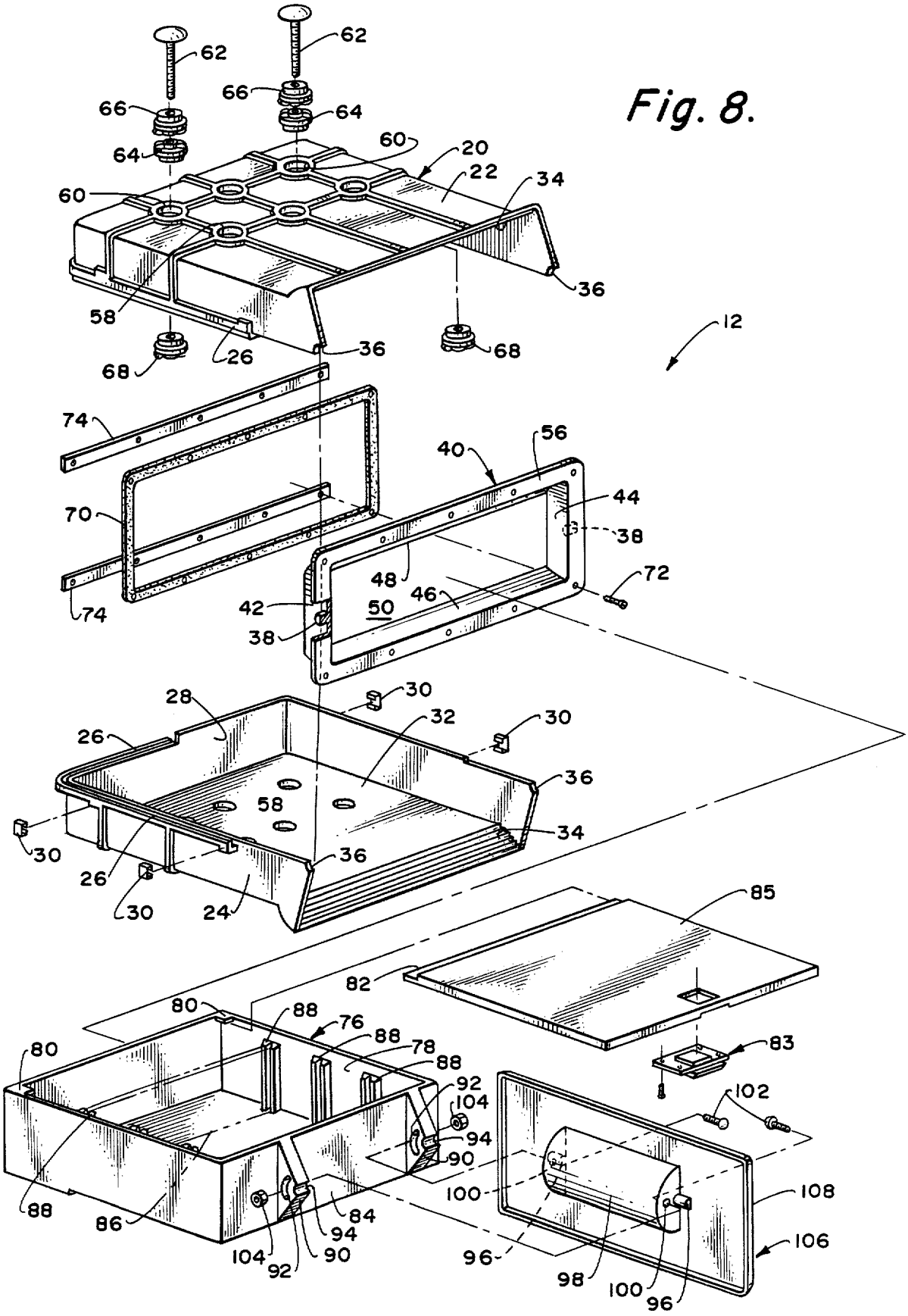
FIG. 8 is an exploded isometric view of the entire drawer apparatus of this invention.

Referring particularly to FIGS. 2, 4 and 5 of the drawings, it is shown that the vertical wall 10 is not exactly vertical, that it assumes a slight inclined angle away from vertical. It has been found within most installations that this angle can be either to the right of vertical, as shown in FIG. 4, or to the left of vertical (not shown). For most installations, the planar surface of the vertical wall 10 will either be within the range of fifteen degrees to either side of vertical, therefore, it is necessary to provide for a total range of thirty degrees.

To install the drawer apparatus 12 of this invention, certain requirements must be met. It is necessary that only common hand and power tools be required, such as saws, files, drills, screw drivers, wrenches, etc. Also, it is necessary that installation be made simple for individuals not necessarily skilled in manual crafts. Also, the design of the drawer apparatus 12 of this invention shall be foregiving of poor workmanship, or shall be made essentially foolproof by providing appropriate templates and gauges as part of the installation kit. Additionally, "blind installation" is a requirement, that is, capable of being installed solely through the cutout opening 18 formed within the vertical wall 10 not requiring any recourse through auxiliary avenues of access for installing of the drawer apparatus 12.

In most instances, the cutout opening 18 will be of a rectangular configuration. However, it is to be understood that the cutout opening 18 will be of specific size coordinated with the transverse cross-sectional size of the drawer apparatus 12. The opening 18 will be formed by merely sawing and removing of the section cut out of the vertical wall 10.

After the hole 18 is formed, the drawer housing 20 is positioned within the space 16. The drawer housing 20 is composed principally of two identical parts 22 and 24. The parts 22 and 24, when located in an abutting facing relationship, interlock together through a cooperating tongue and groove arrangement 26. This tongue and groove arrangement 26 is located on each side of the drawer housing 20 as well as along the rear wall 28. The interlocked parts 22 and 24 are secured together about the tongue and groove assembly 26 by means of clips 30. The now assembled (single unit) drawer housing 20 has a planar bottom supportive surface 32 which is desirable to have located precisely horizontal. Exactly how this surface 32 is positioned horizontal will be explained further on in this specification.

It is to be noted that the assembled drawer housing 20 can be turned upsidedown with there not being any change in configuration. Therefore, the drawer housing 20 can be used in either position.

The front wall of the drawer housing 20 is shown to be open with both the lower edge and the upper edge of the drawer housing 20 being formed into facing serrated surfaces 34. Also, the forward edge of each sidewall of each section 22 and 24 includes a notch 36. Each connecting pair of notches 36 essentially form a partially open, circular opening. Within each circular opening 36 there is to be located a pin 38. The pins 38 are fixedly mounted onto a drawer housing face 40. The drawer housing face 40 is defined by arcuate sidewalls 42 and 44 which are connected together by longitudinal walls 46 and 48. Located beneath the walls 46 and 48 is an opening 50 which provides access into the interior chamber 52 of the drawer housing 20.

Formed on the exterior surface of each of the longitudinal walls 46 and 48 are a series of serrations 54. One series of serrations 54 is to connect with one set of serrations 34 with the other set of serrations 54 connecting with the remaining set of serrations 34. The pins 38 are held in position within their connecting pair of notches 36 thereby holding in position the housing face 40 to the drawer housing 20. As the installer places the drawer housing 20 in position within the space 16, the installer positions the bottom surface 32 to be horizontal. If in doing so it is found that the inner surface of the flange 56 of the drawer housing 40 is not flush with the vertical wall surface 10, then the installer must pivot the entire drawer housing face 40 relative to the drawer housing 20. This pivoting movement is frictionally resisted by the cooperating serrated surfaces 34 and 54. Upon the inner surface of the inner flange 56 coming to rest flush against the wall 10, this will now be the normal "at rest" position of the drawer housing face 40 due to the interconnection of the serrated surfaces 34 and 54. The installer then removes the entire housing 20 from the space 16 with such being set aside.

The installer now selects to remove one or more of "knock out" tabs 58 formed within the section 22. The installer than reinserts the drawer housing 20 within the space 16. The installer then inserts a writing instrument, such as a pen or pencil, through each of the now formed holes 60 that have been created by removing of the tab or tabs 58. The writing pen or pencil is then caused to be moved vertically and come into contact with the underside of bottom 14 forming a mark.

The installer again removes the housing 20 from the space 16. The installer then takes a conventional drill of selected size (not shown) and drills holes through the bottom 16 corresponding to the mark or marks. The installer then places an enlarged headed threaded fastener 62 through each of the formed holes within the bottom 14. The installer then threads a washer assembly 66 onto each fastener 62 until washer assembly 66 tightly abuts against the inside surface 16 thereby securing in place each fastener 62. The installer then relocates the housing 20 back within the space 16 and then positions each of the fasteners 62 through their respective holes 60. The installer can then gauge at about what point along the longitudinal length of the fastener 62 that outer washer assembly 64 should be located. The washer assemblies 64 and 66 will more than likely include a vibration dampening structure, such as either rubber, felt, plastic, etc. The installer then again removes the housing 20 and then proceeds to locate a washer assembly 64 (which is identical to washer assembly 66 except installed in the reverse direction) on each of the fasteners 62 at each of the respectively gauged longitudinal positions. The installer the reinserts the housing 20 within the space 16 with the free end of each of the fasteners 62 extending through their respective holes 60 within the interior chamber 52. The installer then locates an inner washer assembly 68, which is identical to washer assembly 64, but again in a reversed position, on each of the fasteners 62, and is tightened to such a point that the drawer housing 20 is tightly held in position between the washer assembly 64 and 68.

In order to provide a vibration dampening waterproof seal between the flange 56 and the wall 10, there is incorporated a gasket 70. A plurality of bolt fasteners 72 are placed through appropriate holes formed within the flange 56, through the gasket 70 and also through the wall 10 to then engage with an appropriate fastening bar 74. At this time, the drawer housing 20, which includes the drawer housing face 40, is completely installed.

The internal chamber 52 is preselected to be of a size to have located therein in a closely conforming manner a drawer 76. The drawer 76 is basically box-like in configuration and defines an internal compartment 78. Mounted directly against the back wall of drawer 76, and also directly adjacent the open top of the drawer 76, are a pair of inwardly extending lips 80. The lips 80 are to be located over a narrowed ledge 82 formed within the back edge of a cover 85. This cover 85 is removably engaged with the drawer 76.

Within the forward edge of the cover 85 there may be mounted a latch assembly 83. The latch assembly 83 is to engage with the forward wall 84 of the box 76 to latchingly secure the cover 85 onto the drawer 76. However, if desired, the cover 85 can be completely removed from the drawer 76 and not even be utilized.

It is also to be noted that the compartment 78 of the drawer 76 can be divided into a series of smaller compartments by a plurality of dividers 86. Each divider 86 is held in position by groove strips 88 fixedly mounted on the inside surface of the sidewalls of the drawer 76.

Mounted on the front wall 84 are a pair of spaced-apart, identically shaped, triangular shaped protrusions 90. Each protrusion 90 includes a slot 92. Also, each protrusion 90 has formed within its exterior surface and at the apex thereof a groove 94. A pin 96 is to connect with each groove 94. Each pin 96 extends laterally from a cylindrical shaped section 98. It is to be noted that cylindrical shaped section 98 constitutes only about one half of a cylinder. The cylindrical section 98 is to be located between protrusions 90. Formed within each longitudinal end of the section 98 directly adjacent each pin 96 is a hole 100. A bolt fastener 102 is to extend through each hole 100. Each bolt 102 is to then pass through a slot 92 and threadeably connect with a nut 104.

The protrusion 98, as well as pins 96, are integrally mounted on the inside surface of drawer face 106. The drawer face 106 is substantially rectangular in configuration and defines an inwardly extending peripheral flange 108. The flange 108 is selected so when the drawer 76 is in the retracted position (located entirely within the drawing housing 20), the flange 108 abuts against the exterior surface of the wall 10. As a result, the flange 56 is hidden from view thereby making the exterior appearance of the drawer assembly 12 more appealing. It is to be understood that the exterior surface of the drawer face 106 can be formed in any pattern or any desired texture to achieve a more appealing exterior appearance.

It is further to be understood that the drawer face 106 is to be adjusted by pivoting of such relative to the drawer 76 to assume an angle of inclination consistent with the angle of inclination of the drawer housing face 40. Once this angle of inclination has be obtained, the nuts 104 are tightened on fasteners 102 thereby fixing in position this established angle of inclination. The maximum angle of inclination need be only about fifteen degrees (away from vertical) in each direction, making a total of thirty degrees of adjustment. When the drawer 76 is in the retracted position, the pivot axis of the drawer 76 coincides with the pivot axis of the drawer housing face 40.

Centrally disposed within the exterior surface of the drawer face 106 is an enlarged recess 110. The recess 110 functions as a handle grasping area which includes a transversely located protruding bar 112. The function of the bar 112 is to come into contact by the fingers of the user to then facilitate movement of the drawer 76 into and out of the internal chamber 52. There may be incorporated a key operated lock 114 in this area which can be mounted on longitudinal wall 46.

What is claimed is:

1. A drawer apparatus comprising:

a drawer housing adapted to be fixedly mounted within an enclosed space defined in part by an exterior planar wall, said drawer housing having an open front wall providing access into an interior compartment;

a drawer housing face connected to said drawer housing by first connecting means, said drawer housing face to butt against said exterior planar wall, said first connecting means permitting pivoting of said drawer housing face about a first pivot axis relative to said drawer housing, said drawer housing face to be initially pivoted about said first pivot axis until said drawer housing face assumes a desired position butting against said exterior planar wall, said drawer housing face being then fixed in said desired position by first fixing means;

a drawer located within said interior compartment, said drawer slideably movable relative to said drawer housing between a retracted position and an extended position, said retracted position defined when said drawer is substantially totally confined within said interior compartment, said extended position defined when said drawer is substantially located exteriorly of said interior compartment, said drawer having an article containing compartment; and a drawer face mounted by second connecting means to said drawer, said second connecting means permitting pivoting of said drawer face about a second pivot axis relative to said drawer, said drawer face being pivotally adjusted to a particular position and then permanently fixed in said particular position by second fixing means, with said drawer in said retracted position said drawer face to be in juxtaposition with said drawer housing face and to also abut against said exterior planar wall.

2. The drawer apparatus as defined in claim 1 wherein:

said drawer housing composed of two separate identical parts secured together in a facing relationship.

3. The drawer apparatus as defined in claim 1 wherein:

said drawer closely conforming within of said interior compartment.

4. The drawer apparatus as defined in claim 1 wherein:

said limited amount of pivotal movement is about thirty degrees.

5. The drawer apparatus as defined in claim 1 wherein:

said drawer housing face connecting with said drawer housing through a serrated surface assembly, said serrated surface assembly providing frictional resistance during pivotable movement of said drawer housing face relative to said drawer housing.

6. The drawer apparatus as defined in claim 1 wherein:

said second pivot axis is parallel to said first pivot axis.

7. The drawer apparatus as defined in claim 6 wherein:

a first pivot axis and said second pivot axis are located on the same horizontal plane.

8. The drawer apparatus as defined in claim 7 wherein:

said second pivot axis coincides with said first pivot axis when said drawer is in said retracted position.

9. The drawer apparatus as defined in claim 1 wherein:

said first connecting means comprising a first pin and slot assembly, said second connecting means comprising a second pin and slot assembly.

10. The drawer apparatus as defined in claim 1 including:

a cover being mounted on said drawer, said cover functioning to close said article containing compartment, said cover openable to permit access into said article containing compartment.

11. The drawer apparatus as defined in claim 1 including:

a supporting bracket assembly connecting with said drawer housing, said supporting bracket assembly to connect with said drawer housing at a substantial spaced distance from said drawer housing face, said supporting bracket assembly is adjustable so as to position the bottom wall of said interior compartment substantially horizontal.

12. The drawer apparatus as defined in claim 1 including:

a plurality of dividers to be mounted within said article containing compartment of said drawer, said dividers functioning to divide said article containing compartment into a plurality of separate compartments.

13. The drawer apparatus comprising:

a drawer housing adapted to be fixedly mounted within an enclosed space defined in part by an exterior inner wall, said drawer housing having an open front wall providing access into an interior compartment;

a drawer housing face, first connection means for connecting said drawer housing face to said drawer housing, said first connecting means permitting movement of said drawer housing face relative to said drawer housing, first fixing means for fixing said drawer housing face to said drawer housing upon locating of said drawer housing face in a desire position;

a drawer located within said interior compartment, said drawer being movable relative to said drawer housing between the retracted position and an extended position, said retracted position defined when said drawer is substantially totally confined within said interior compartment, said extended position defined when said drawer is substantially located exteriorly of said interior compartment; and a drawer face, second connection means for mounted said drawer face to said drawer, said second connection means permitting movement of said drawer face relative to said drawer, second fixing means for fixing said drawer face to said drawer upon locating of said drawer face in a particular position, with said drawer in said retracted position said drawer face to be in juxtaposition with said drawer housing face and to also abut against said exterior planar wall.

*14. A drawer apparatus comprising:*

*a drawer housing adapted to be fixedly mounted within an enclosed space defined in part by an exterior planar wall, said drawer housing having an open front wall providing access into an interior compartment;*

*a drawer housing face connected to said drawer housing by first connecting means, said drawer housing face to butt against said exterior planar wall, said first connecting means permitting pivoting of said drawer housing face about a first pivot axis relative to said drawer housing, said drawer housing face to be initially pivoted about said first pivot axis until said drawer housing face assumes a desired position butting against said exterior planar wall, said drawer housing face being then fixed in said desired position by first fixing means;*

*a drawer located within said interior compartment, said drawer slideably movable relative to said drawer housing between a retracted position and an extended position, said retracted position defined when said drawer is substantially totally confined within said interior compartment, said extended position defined when said drawer is substantially located exteriorly of said interior compartment, said drawer having an article containing compartment; and* said drawer housing face having an opening, said opening connecting with said interior compartment of said drawer housing, said drawer being slideable through said opening with said drawer opening face in any pivoted position relative to said drawer housing.

*15. The drawer apparatus as defined in claim 14 wherein:*

*said drawer housing composed of two separate identical parts secured together in a facing relationship.*

*16. The drawer apparatus as defined in claim 14 wherein:*

*said drawer closely conforming within of said interior compartment.*

*17. The drawer apparatus as defined in claim 14 wherein:*

*said limited amount of pivotal movement is about thirty degrees.*

*18. The drawer apparatus as defined in claim 14 including:*

*a cover being mounted on said drawer, said cover functioning to close said article containing compartment, said cover openable to permit access into said article containing compartment.*

*19. The drawer apparatus as defined in claim 14 including:*

*a supporting bracket assembly connecting with said drawer housing, said supporting bracket assembly to connect with said drawer housing at a substantial spaced distance from said drawer housing face, said supporting bracket assembly is adjustable so as to position the bottom wall of said interior compartment substantially horizontal.*

*20. The drawer apparatus as defined in claim 14 including:*

*a plurality of dividers to be mounted within said article containing compartment of said drawer, said dividers functioning to divide said article containing compartment into a plurality of separate compartments.*

*21. The drawer apparatus comprising:*

*a drawer housing adapted to be fixedly mounted within an enclosed space defined in part by an exterior inner wall, said drawer housing having an open front wall providing access into an interior compartment;*

*a drawer housing face, first connection means for connecting said drawer housing face to said drawer housing, said first connection means permitting movement of said drawer housing face between a plurality of positions relative to said drawer housing, first fixing means for fixing said drawer housing face to said drawer housing upon locating of said drawer housing face in a desired position;*

*a drawer located within said interior compartment, said drawer being movable relative to said drawer housing between the retracted position and an extended position, said retracted position defined when said drawer is substantially totally confined within said interior compartment, said extended position defined when said drawer is substantially located exteriorly of said interior compartment; and*

*said drawer housing face having an opening, said opening connecting with said interior compartment of said drawer housing, said drawer being slideable through said opening with said drawer housing face in any one of said plurality of positions.*

* * * * *